US012664844B2

(12) United States Patent
Castro

(10) Patent No.: US 12,664,844 B2
(45) Date of Patent: Jun. 23, 2026

(54) SMART POD SYSTEM FOR SECURE AND TRANSPARENT PACKAGE DELIVERY

(71) Applicant: Buchner V. Castro, Clarkstown, NY (US)

(72) Inventor: Buchner V. Castro, Clarkstown, NY (US)

(73) Assignee: Buchner V. Castro, Clarkstown, NY (US)

( * ) Notice: Subject to any disclaimer, the term of this patent is extended or adjusted under 35 U.S.C. 154(b) by 0 days.

(21) Appl. No.: 18/768,050

(22) Filed: Jul. 10, 2024

(65) Prior Publication Data

US 2026/0018000 A1 Jan. 15, 2026

(51) Int. Cl.
*G07C 9/00* (2020.01)
*G07C 9/22* (2020.01)
*G08B 25/01* (2006.01)

(52) U.S. Cl.
CPC ..... *G07C 9/00912* (2013.01); *G07C 9/00309* (2013.01); *G07C 9/00563* (2013.01); *G07C 9/22* (2020.01); *G08B 25/016* (2013.01); *G07C 2009/00539* (2013.01)

(58) Field of Classification Search
None
See application file for complete search history.

(56) References Cited

U.S. PATENT DOCUMENTS 4,688,023 A * 8/1987 McGill .................. G08B 21/18
292/87
6,323,622 B1 * 11/2001 Lin ....................... H02J 7/0069
320/132
9,004,346 B2 * 4/2015 Farentinos ............. A47G 29/22
232/43.3
11,272,145 B2 * 3/2022 Somers .................. G06Q 10/08
11,369,222 B2 * 6/2022 Kennett .................. E05B 47/00
11,759,040 B2 * 9/2023 Richardson ........ G06Q 10/0836
705/332
11,773,624 B2 * 10/2023 Klein ...................... E05G 1/005
109/52
2012/0310410 A1 * 12/2012 Adams .................... G16Z 99/00
700/237
2013/0321622 A1 * 12/2013 Safreno .................... G01V 5/26
220/1.5
2015/0102903 A1 * 4/2015 Wilkinson ........... A47G 29/141
340/5.61

(Continued)

FOREIGN PATENT DOCUMENTS

CN 222382387 U * 1/2025

*Primary Examiner* — Carlos Garcia

(57) ABSTRACT

The present invention relates to a smart pod system comprising a housing, a power supply, an electronic locking mechanism, and an internal camera. The system includes at least one external sensor, such as a motion sensor, microphone, or camera, a wireless communication module for data transmission, and a control unit operatively connected to the components. The user interface includes a touch screen and biometric authentication devices. A software application executable on an external device interacts with the smart pod system to control the locking mechanism, access data from the sensors and internal camera, and manage user authentication. This system enhances the security, transparency, and efficiency of package delivery by providing real-time monitoring of contents and remote access control.

20 Claims, 5 Drawing Sheets

(56) References Cited

U.S. PATENT DOCUMENTS

| | | | | |
|---|---|---|---|---|
| 2021/0010315 | A1* | 1/2021 | Honjo | H04L 12/2827 |
| 2022/0169401 | A1* | 6/2022 | Di Cosola | B60L 53/51 |
| 2023/0111696 | A1* | 4/2023 | Souza | H03F 1/0222<br>330/136 |
| 2023/0264833 | A1* | 8/2023 | Biriuk | B64U 80/40<br>244/114 R |
| 2024/0305752 | A1* | 9/2024 | Almomani | G07C 9/00182 |
| 2025/0316032 | A1* | 10/2025 | Khan | G06T 19/006 |

* cited by examiner

SMART POD SYSTEM FOR SECURE AND TRANSPARENT PACKAGE DELIVERY

FIELD OF INVENTION

The present invention relates generally to the field of package delivery systems, specifically to a smart pod system designed to enhance the security, transparency, and efficiency of transporting goods.

BACKGROUND

The advancement of package delivery systems has become increasingly important due to the exponential growth of e-commerce and online shopping. Traditional shipping methods, largely reliant on cardboard boxes and basic tracking numbers, fail to provide the necessary security and transparency that modern consumers demand. These conventional methods often result in issues such as package theft, damage, and lack of real-time tracking, which can lead to consumer dissatisfaction and loss of trust in the delivery process.

In the current landscape, major carriers like Amazon, UPS, FedEx, and DHL dominate the market, handling vast quantities of deliveries daily. While these companies have made significant strides in optimizing their logistics and delivery operations, the fundamental security and transparency of the packages themselves have seen minimal innovation. This gap has become particularly pronounced as the value and sensitivity of shipped items increase, necessitating a more robust solution to ensure that packages arrive safely and intact.

The existing shipping systems also fall short in addressing environmental concerns. The prevalent use of single-use cardboard boxes contributes significantly to waste and environmental degradation. Despite efforts to recycle and reduce packaging materials, the shipping industry still generates substantial waste, highlighting the need for a more sustainable, reusable solution that can mitigate the environmental impact of the delivery process.

Another critical issue with current shipping methods is the lack of real-time monitoring and security features. Packages are often left unattended on doorsteps, making them susceptible to theft. The absence of real-time surveillance and tamper-proof mechanisms means that once a package is out for delivery, both the sender and receiver have limited visibility and control over its security. This lack of transparency can lead to increased instances of lost or stolen packages, further eroding consumer confidence.

Additionally, the conventional package delivery system does not provide adequate protection for sensitive or high-value items. The inability to monitor the interior condition of a package during transit means that fragile items, medications, and other valuable goods are at risk of damage or unauthorized access. Current tracking systems only provide basic location updates without offering insight into the package's condition or security status.

The growing complexity of global supply chains further exacerbates these challenges. As packages travel through multiple hands and transit points, the risk of tampering, loss, and damage increases. Current systems lack the sophistication needed to ensure continuous, reliable monitoring throughout the entire delivery journey. This inadequacy can result in significant financial losses and logistical challenges for businesses and consumers alike.

In response to these limitations, there is a pressing need for an innovative solution that combines enhanced security features, real-time tracking capabilities, and sustainable practices. Such a system would not only improve the efficiency and reliability of package deliveries but also address the critical concerns of security, transparency, and environmental impact. The development of advanced shipping solutions that integrate modern technology and sustainable materials represents a significant step forward in meeting the evolving demands of consumers and businesses in the digital age.

By addressing these shortcomings, the proposed invention aims to revolutionize the package delivery industry, providing a comprehensive solution that ensures the safety, integrity, and transparency of shipments from the point of origin to the final destination. The integration of smart technologies, robust security features, and eco-friendly materials will set a new standard for the future of package delivery systems, offering unparalleled peace of mind and efficiency for all stakeholders involved.

It is within this context that the present invention is provided.

SUMMARY

The present invention relates to a smart pod system comprising a housing, a power supply, an electronic locking mechanism, and an internal camera. The system includes at least one sensor, a wireless communication module, a control unit, and a user interface with a touch screen and biometric authentication devices. Additionally, a software application executable on an external device is used to interact with the smart pod system, enabling remote control of the locking mechanism, data access, and user authentication management.

In some embodiments, the power supply includes at least one solar panel disposed on the exterior of the housing. This feature allows the smart pod to harness solar energy, extending the operational lifespan and reducing dependency on traditional power sources.

In further embodiments, the power supply comprises an onboard battery, such as a lithium-ion battery or a nickel-metal hydride battery. This provides a reliable and rechargeable power source for the smart pod's components.

In yet further embodiments, the smart pod includes a 360-degree external camera. This camera allows comprehensive monitoring of the surroundings, enhancing the security and situational awareness of the system.

In some embodiments, the user interface comprises an ID reader, which facilitates the scanning of identification credentials. This feature adds an additional layer of security by verifying the identity of users accessing the smart pod.

In further embodiments, the biometric authentication devices include fingerprint scanners, facial recognition scanners, and retinal scanners. These devices ensure secure and accurate user authentication, preventing unauthorized access.

In yet further embodiments, the electronic locking mechanism can be remotely controlled via the software application. This allows users to manage access to the smart pod conveniently from their external devices.

In some embodiments, the wireless communication module supports Wi-Fi and Bluetooth connectivity. This enables seamless data transmission and communication between the smart pod and external devices.

In further embodiments, the housing is constructed from tamper-proof materials such as stainless steel and fiberglass-reinforced plastic. This construction enhances the durability and security of the smart pod, protecting its contents from tampering and environmental damage.

In yet further embodiments, the control unit includes an audible alarm system. The alarm can emit sound in response to unauthorized access attempts, deterring potential intruders.

In some embodiments, the control unit is connected to a global positioning system (GPS) module. This allows real-time tracking of the smart pod's location, providing valuable information for logistics and security purposes.

In further embodiments, an LED alert light is disposed on the exterior of the housing. The LED light indicates the status of the electronic locking mechanism, providing visual confirmation to users In yet further embodiments, the internal camera captures high-definition images or video. This ensures clear and detailed monitoring of the smart pod's contents during transit.

In some embodiments, the control unit includes a microcontroller and onboard firmware memory. These components manage the smart pod's functions and store essential data for system operations In further embodiments, the software application provides real-time notifications to users about the status and security of the smart pod. This feature keeps stakeholders informed and allows prompt responses to any issues.

In yet further embodiments, the smart pod includes an anti-theft tracking chip. This chip provides real-time location updates, aiding in the recovery of the smart pod if it is stolen.

In some embodiments, the housing contains internal foam cushions. These cushions protect the contents from damage during transit, ensuring the safe delivery of items In further embodiments, the software application interacts with the smart pod system via a cloud-based network. This enables efficient data management and remote access to the smart pod's features.

In yet further embodiments, the smart pod includes a manual override switch. This switch allows manual access to the smart pod's contents in case of emergency or technical failure.

In some embodiments, the software application stores and analyzes historical data related to the smart pod's usage and security events. This information can be used for performance monitoring and security assessments.

In further embodiments, the internal camera operates under low-light conditions and includes an infrared (IR) sensor. This capability ensures continuous monitoring regardless of lighting conditions.

In yet further embodiments, the smart pod includes a speaker. The speaker can emit audible alerts in response to remote commands or security events, providing an additional deterrent against tampering.

In some embodiments, the software application includes artificial intelligence (AI) algorithms. These algorithms analyze data from the sensors and cameras for security purposes, enhancing the overall effectiveness of the system.

In further embodiments, the housing has multiple secured access doors, each connected to the electronic locking mechanism. This allows flexible access options while maintaining security.

In some embodiments, the housing is weatherproof, waterproof, and fire proof or flame retardant.

BRIEF DESCRIPTION OF THE DRAWINGS

Various embodiments of the invention are disclosed in the following detailed description and accompanying drawings.

Figure 1:
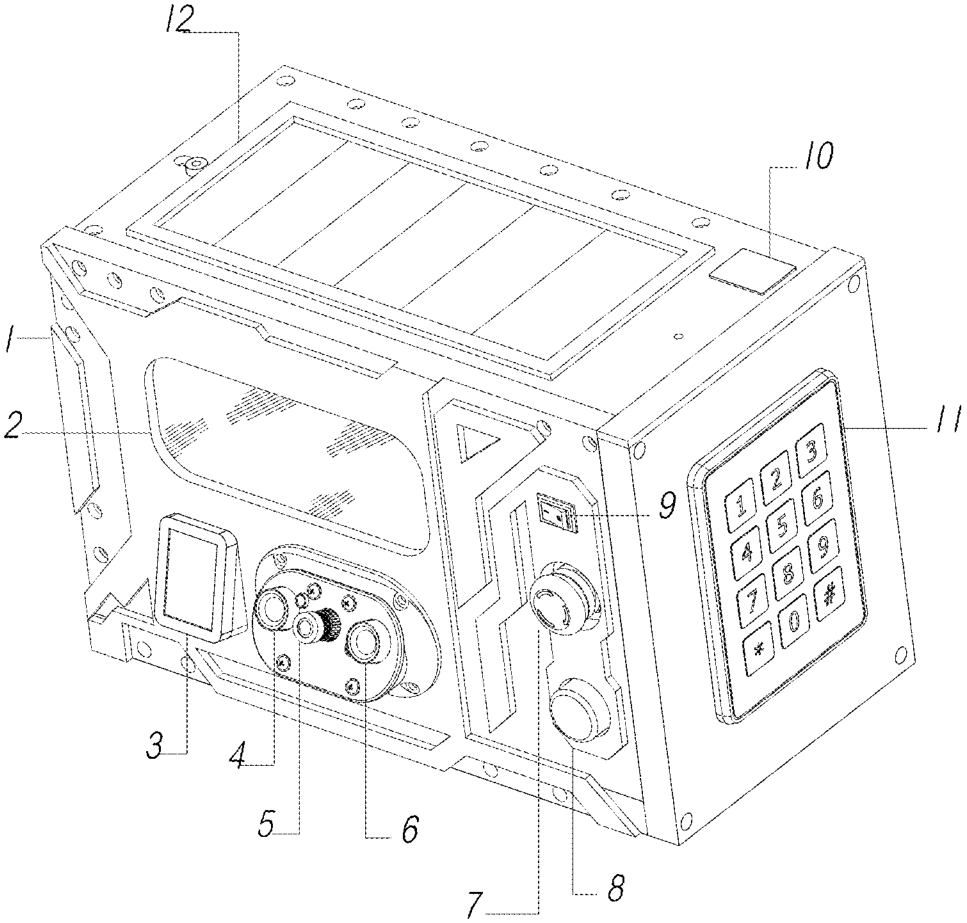
FIG. 1 illustrates an example of the smart pod from a perspective view in a closed position.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

The terminology used herein is for the purpose of describing particular embodiments only and is not intended to be limiting of the invention.

As used herein, the term "and/or" includes any combinations of one or more of the associated listed items.

As used herein, the singular forms "a," "an," and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The terms "about" and "approximately" indicate an acceptable degree of error or variation in measurements, usually within 20%, preferably within 10%, and more preferably within 5% of a given value or range. Numerical values provided in this description are approximate unless stated otherwise.

When a feature or element is described as being "on" or "directly on" another feature or element, there may or may not be intervening features or elements present. Similarly, when a feature or element is described as being "connected," "attached," or "coupled" to another feature or element, there may or may not be intervening features or elements present. The features and elements described with respect to one embodiment can be applied to other embodiments.

The use of spatial terms, such as "under," "below," "lower," "over," "upper," etc., is used for ease of explanation to describe the relationship between elements when the apparatus is in its proper orientation.

The terms "first," "second," and the like are used to distinguish different elements or features, but these elements or features should not be limited by these terms. A first element or feature described can be referred to as a second element or feature and vice versa without departing from the teachings of the present disclosure.

The term "housing" refers to the structural enclosure that contains and protects the internal components of the smart pod system. This includes, but is not limited to, the exterior shell, internal compartments, and any access doors. In one example implementation, the housing may be constructed from stainless steel, providing a tamper-proof and durable enclosure that is resistant to environmental damage. Other suitable materials for the housing include fiberglass-reinforced plastic and other rigid, impact-resistant materials.

The term "power supply" refers to the component or combination of components that provide electrical power to the smart pod system. This includes, but is not limited to, batteries, solar panels, and power ports. In one example implementation, the power supply may include a solar panel disposed on the exterior of the housing to harness solar energy, coupled with a lithium-ion battery to store the collected energy and provide a reliable power source. Other suitable power supply configurations include nickel-metal hydride batteries, 120V outlet ports, and 5V USB ports.

The term "electronic locking mechanism" refers to the system used to secure the smart pod and prevent unauthorized access. This includes, but is not limited to, electronic locks, actuators, and control circuits. In one example implementation, the electronic locking mechanism may be an electrically controlled deadbolt that engages or disengages based on commands from the control unit or user interface.

The term "sensor" refers to any device that detects and responds to changes in the environment around or within the smart pod. This includes, but is not limited to, motion sensors, microphones, cameras, and other environmental sensors. In one example implementation, a motion sensor may be used to detect movement around the smart pod, while a microphone can monitor ambient sound levels. The system may also include a 360-degree external camera to provide comprehensive visual monitoring.

The term "internal camera" refers to a camera installed within the housing of the smart pod, configured to capture real-time images or video of the contents of the smart pod. In one example implementation, the internal camera may be a high-definition camera with infrared capabilities to allow for low-light operation, ensuring continuous monitoring of the contents regardless of external lighting conditions.

The term "wireless communication module" refers to the hardware component that enables the smart pod to transmit and receive data wirelessly. This includes, but is not limited to, Wi-Fi and Bluetooth modules. In one example implementation, the wireless communication module may use a Wi-Fi transceiver to connect to a local network and a Bluetooth module for short-range communication with nearby devices.

The term "control unit" refers to the central processing system within the smart pod that manages and coordinates the functions of various components. This includes, but is not limited to, a microcontroller, firmware memory, and interfacing circuits. In one example implementation, the control unit may include a microcontroller that processes input from the sensors and user interface, controls the electronic locking mechanism, and manages data communication via the wireless communication module.

The term "user interface" refers to any software or hardware component that allows a user to interact with the smart pod system. This includes, but is not limited to, touch screens, keypads, and biometric authentication devices. In one example implementation, the user interface may be a touch screen display mounted on the exterior of the housing, providing users with a graphical interface to input commands and view status information. Biometric devices such as fingerprint scanners, facial recognition scanners, and retinal scanners can be integrated into the user interface to enhance security.

The term "software application" refers to the program executed on an external device that communicates with the smart pod system. This includes, but is not limited to, mobile applications and desktop software. In one example implementation, the software application may be a mobile app that allows users to remotely control the electronic locking mechanism, access real-time data from the sensors and cameras, and receive notifications about the status and security of the smart pod.

In various implementations, suitable materials for constructing the housing include metals such as stainless steel and aluminum, as well as durable plastics like polycarbonate and ABS (Acrylonitrile Butadiene Styrene). The power supply components may utilize advanced battery technologies such as lithium polymer and solid-state batteries to enhance energy density and safety. The sensors and electronic components may be sourced from high-reliability suppliers to ensure consistent performance under varying environmental conditions.

In some configurations, the smart pod may incorporate additional security features such as tamper-evident seals and encrypted data transmission to protect against unauthorized access and data breaches. The internal camera may be equipped with image stabilization and high dynamic range (HDR) capabilities to improve image quality under diverse lighting conditions. The wireless communication module may support multiple connectivity standards, including LTE and 5G, to enhance communication range and reliability.

DESCRIPTION OF DRAWINGS

The present invention relates to a smart pod system designed to enhance the security, transparency, and efficiency of package delivery and storage. This invention addresses several critical shortcomings of the prior art, particularly the lack of real-time monitoring, inadequate security measures, and the environmental impact of traditional single-use packaging materials. By integrating advanced technologies and sustainable materials, the smart pod system provides a comprehensive solution that improves the reliability and safety of the supply chain.

A significant innovation of the smart pod system is the incorporation of an internal camera that allows users to view the contents of the container at any point during transit. This feature provides unparalleled transparency, enabling stakeholders to verify the integrity and security of the contents in real time. Unlike traditional shipping methods, which only offer basic tracking information, the smart pod's internal camera delivers detailed visual data, ensuring that the contents remain secure and undisturbed throughout the entire delivery process. This capability is particularly beneficial for shipping high-value or sensitive items, where maintaining visibility over the contents is crucial.

The smart pod system comprises a housing constructed from tamper-proof materials, an electronic locking mechanism, and a range of sensors, including motion sensors, microphones, and both external and internal cameras. The housing is designed to protect the contents from physical damage and unauthorized access, while the electronic locking mechanism ensures that only authorized individuals can open the smart pod. The internal camera is strategically placed within the housing to provide a clear view of the contents, capturing high-definition images or video that can be accessed remotely via a dedicated software application.

This system also includes a wireless communication module, allowing the smart pod to transmit real-time data to external devices such as smartphones and computers. Users can interact with the smart pod through a user-friendly interface that includes a touch screen and biometric authentication devices, enhancing the security and convenience of accessing the pod. The software application not only facilitates remote control of the locking mechanism but also enables users to monitor the status and security of the smart pod, receive notifications, and manage access permissions.

Furthermore, the smart pod is powered by a combination of solar panels and onboard batteries, ensuring a sustainable and reliable energy source. This eco-friendly power solution reduces the environmental impact of the system, making it a suitable alternative to traditional single-use packaging. The smart pod's robust construction and advanced security features significantly reduce the risk of theft and damage, providing peace of mind to both senders and recipients.

The smart pod system also integrates with a cloud-based network, which supports various administrative and operational functions. The cloud-based network allows stakeholders to manage subscriptions, configure smart pods, and monitor their status. The network also supports advanced features such as AI algorithms for security breach detection, blockchain for secure data recording, and notifications for real-time alerts.

The smart pod system operates in conjunction with a software application accessible on multiple devices, including smartphones, tablets, and desktop computers. This application provides a seamless interface for stakeholders to interact with the smart pod, view live data and images, and control various functionalities. The cloud-based network ensures that all data is securely transmitted and stored, providing a reliable platform for managing the smart pod system.

Figure 2:
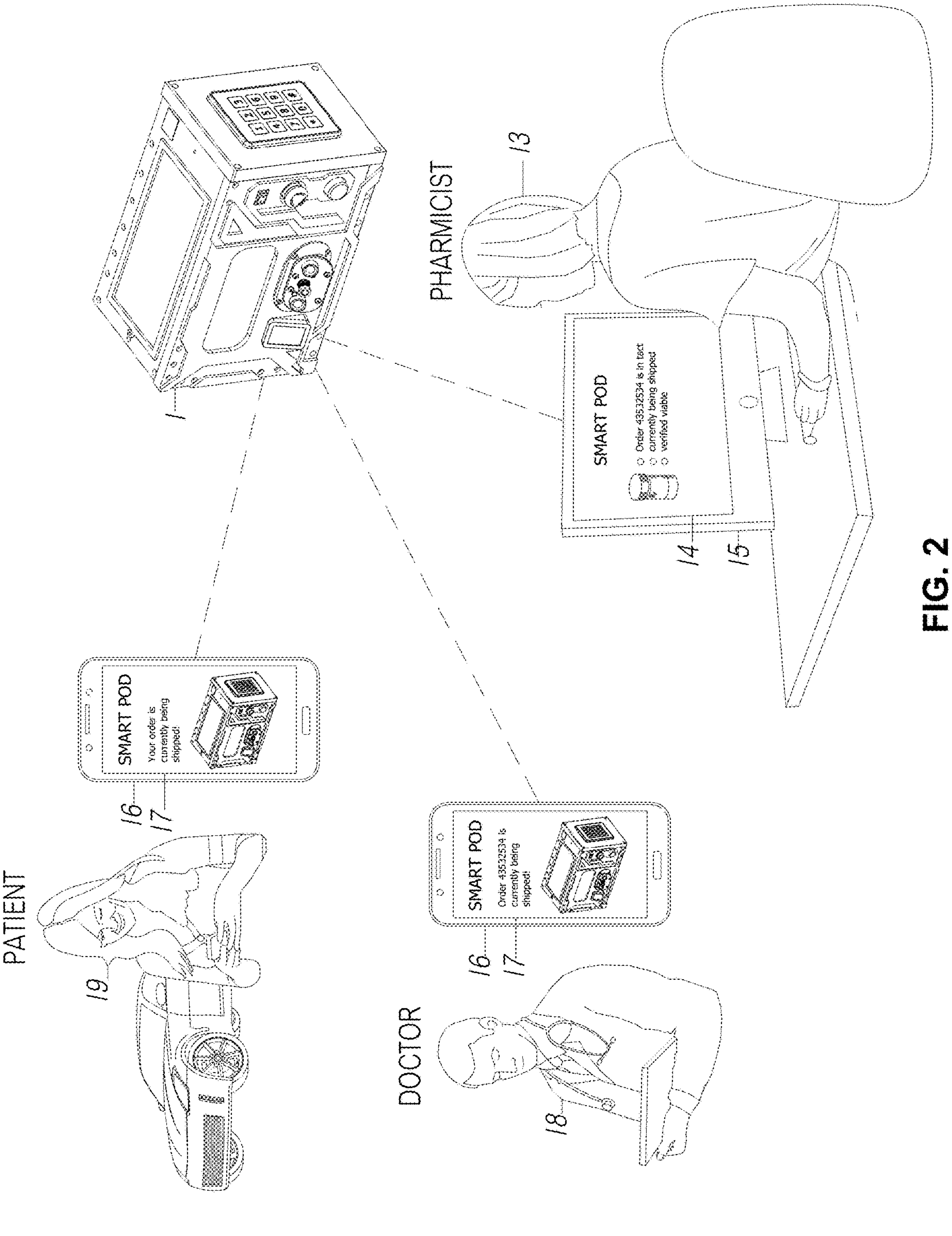
FIG. 2 illustrates an example of the smart pod interacting with stakeholders wirelessly.
Figure 3:
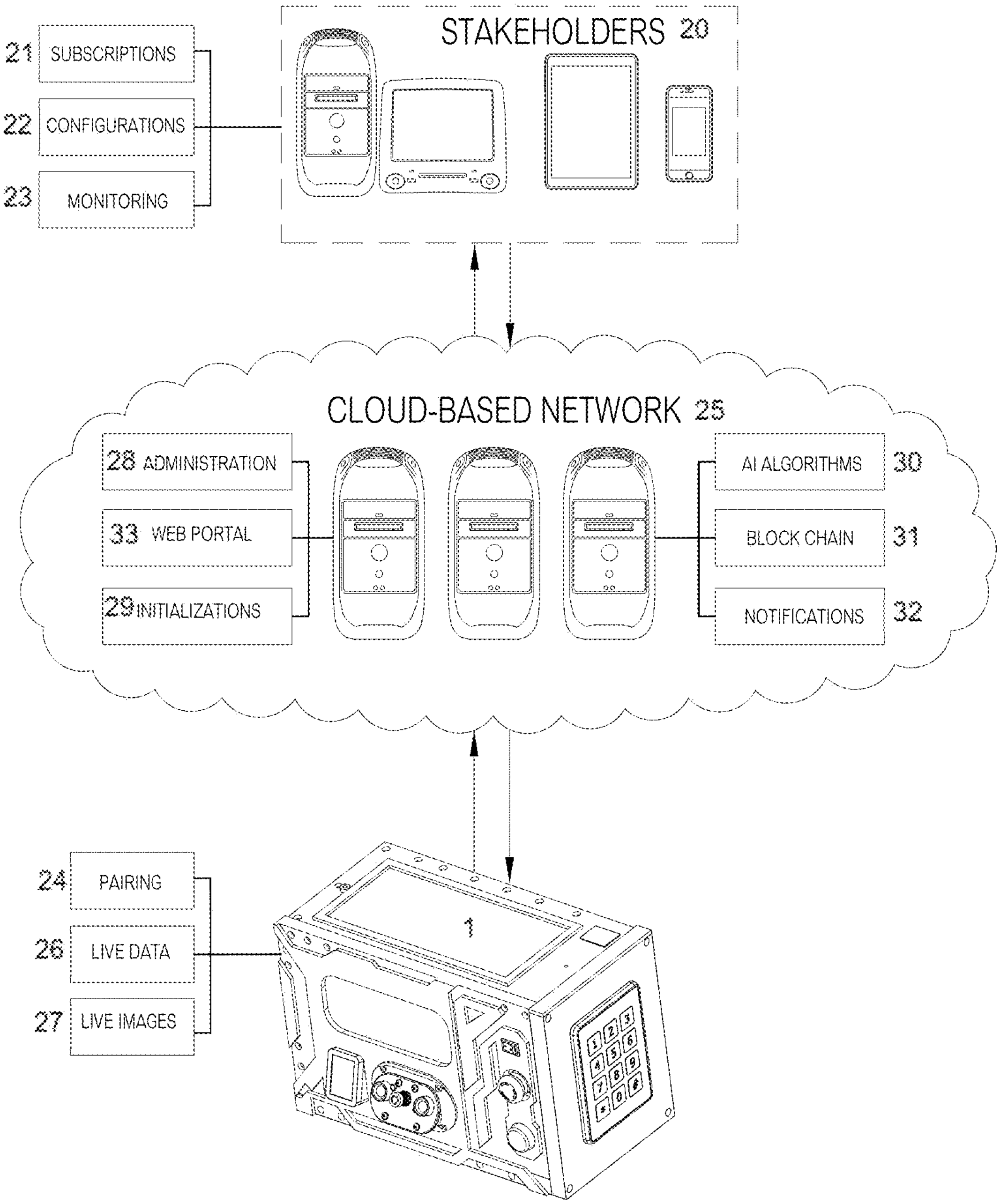
FIG. 3 illustrates an example of the smart pod process flow with a cloud-based network and stakeholder interactions.

Referring now to the drawings, FIGS. 1-3 show a first example configuration of the smart pod container of the invention.

FIG. 1 shows a perspective view of the first embodiment of smart pod 1 comprised of a cube-shaped device that has portions that are hinged and can be opened—other embodiments can have a myriad of shapes including but not limited to: rectangles, spheres, triangles, and hexagons etc.

The device is constructed of a tamper proof, rigid material including but not limited to: stainless steel, fiberglass-reinforced Derlin plastic and the like. Smart pod 1 can have a multitude of secured access doors that allow a product to be locked and stored therein. A top portion of smart pod 1 having a plurality of solar panels 12 to charge the device. Other forms of power supply can include but not be limited to onboard lithium-ion batteries, nickel hydride batteries, 120V outlet ports, 5V USB ports and the like. Said top portion also containing audio functions 10 (speaker and microphone). A front portion of smart pod 1 having touch screen 2 and biometric sensors including but not limited to: finger print scanner 3; retinal scanner 4; facial recognition scanner 5; and identification scanner 6 (QR code, barcode for employee ID cards etc.). Other parts on this side can include 360-degree full motion high-definition video camera 7 and 25 mega pixel, still camera 8 thereon.

A side portion of smart pod 1 having a manual over-ride switch 9 that allows users to operate keypad 11 for manual entry into the device. The smart pod 1 also having internal components such as but not limited to a micro controller, onboard firmware memory, wireless transmitter (Wifi, Bluetooth etc.) that allow it to connect to the internet, mobile devices and cloud networks. Said microcontroller also having onboard audible alarms, global positioning systems, remote locking capabilities and live streaming of all onboard sensors.

FIG. 2 shows the same smart pod 1 interacting in real time with stakeholders wirelessly. The doctor 18 receiving order status from smart pod 1 using the smart pod app 17 on a smart phone 16, the patient also receiving order status from smart pod 1 using the smart pod app 17 on a smart phone 16 and the pharmacist receiving order status from smart pod 1 using desktop computer 16 with desktop app version 14.

FIG. 3 shows a representative view of the smart pod process in the first embodiment, which includes the interactions between stakeholders 20 and the cloud-based network 25 supporting the smart pod 1. The stakeholders 20 can perform various functions such as subscription level sign-up 21, configuration 22, and monitoring 23 through devices like desktop computers 15, tablets, and smartphones 16. This is usually done via a web-based portal 33.

The smart pod 1 operates by pairing 24 with the cloud-based network 25, allowing for the collection and transmission of live data 26, such as biometrics and alarms, and live images 27, including still and video recordings. The smart pod 1 is connected to the cloud-based network 25 via a wireless communication module 6, enabling real-time data exchange.

The cloud-based network 25 comprises several administrative and operational functions, including administration 28 (managing subscriptions, receiving payments, user demographics, etc.), a web portal 14 (for registering and configuring smart pods, consumer shopping, establishing shipping options, etc.), and initialization 29 (setting security levels, sensor thresholds, alarm thresholds, and passcodes for manual overrides).

Additionally, the cloud-based network 25 supports AI algorithms 30 for security breach detection and trend analysis, blockchain technology 31 for secure data recording, and notification systems 32 for real-time alerts (audible alarms, emails, SMS, text messages, etc.). These features ensure that all data is securely transmitted and stored, providing a reliable platform for managing the smart pod system.

The stakeholders 20 interact with the smart pod 1 through various devices, accessing the cloud-based network 25 to monitor and manage the smart pod's status and security. The live data 26 and images 27 collected by the smart pod 1 are transmitted to the cloud-based network 25, allowing stakeholders 20 to receive real-time updates and take necessary actions based on the information provided.

The smart pod 1 integrates seamlessly with the cloud-based network 25, ensuring comprehensive monitoring and management of the delivery process. The system provides stakeholders 20 with the tools and information needed to ensure the security and integrity of the contents within the smart pod 1 throughout the entire delivery journey.

Figure 4:
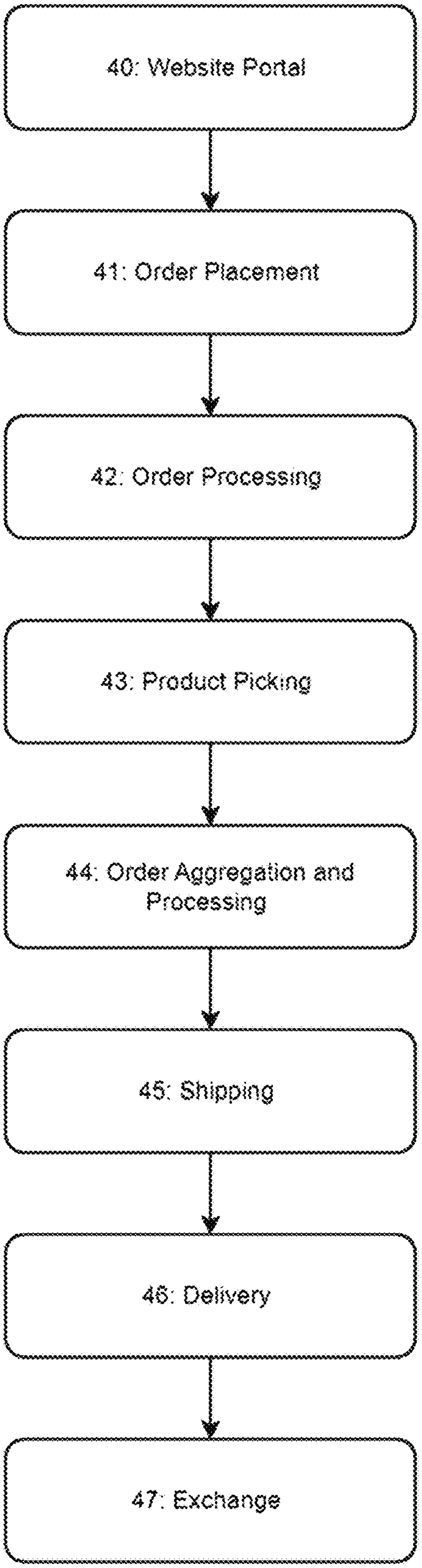
FIG. 4 illustrates an example of the method steps involved in using the smart pod system.

FIG. 4 shows an example process flow for the smart pod system, illustrating the computer-implemented steps in a user journey to acquire an item through the system. The process includes the following steps:

Step 40: Website Portal-A user accesses the website portal to create a secure digital profile for registration and verification. This profile enables the user to interact with the smart pod system through the associated app. The registration process involves providing personal information, verifying identity through biometric data or other secure methods, and setting up account preferences.

Step 41: Order Placement—The user places an order for a product available through the smart pod system using the website or app. The order placement includes selecting the desired items, choosing delivery options, and confirming the purchase. The system generates an order number and sends a confirmation notification to the user.

Step 42: Order Processing—The licensed systems and teams receive the order and begin processing it. This step involves verifying product availability, preparing the items for shipment, and updating the order status in the system. The processing team ensures that each item is handled with care, following strict protocols to maintain product integrity.

Step 43: Product Picking-When a distributor is assigned to pick the product, they use a body camera to generate a live recording of the process. This recording, along with smartphone recordings, is available to stakeholders for accountability and ensures that the order is carefully handled. The system updates the order status to reflect that the product is being picked.

Step 44: Order Aggregation and Processing-During this stage, orders being sent to the same area may be grouped into aggregate smart pods for transport. This efficient grouping helps optimize the delivery process and reduces transportation costs. The system monitors and updates the status of each grouped order.

Step 45: Shipping—The smart pods are registered and verified along the supply chain. They are equipped with the necessary sensors and internal cameras to ensure real-time monitoring. The system streams live data and images to all stakeholders, including customers, vendors, shippers, and drivers. This continuous monitoring provides transparency and enhances security during transit.

Step 46: Delivery—Upon arrival at the user's destination, the smart pod notifies the user of the delivery. The customer verifies that the smart pod has been delivered and can either receive the items directly or have them placed in a secure location, such as a provided bag hung outside. The verification process is performed online through the app or desktop computer, and the system updates the delivery status accordingly.

Step 47: Exchange—After the customer has retrieved their items, they exchange the empty smart pod for a new one for future deliveries. The smart pod can be taken to secure drop-off locations or picked up by a delivery service. The system records the exchange and prepares the smart pod for its next use.

Figure 5A:
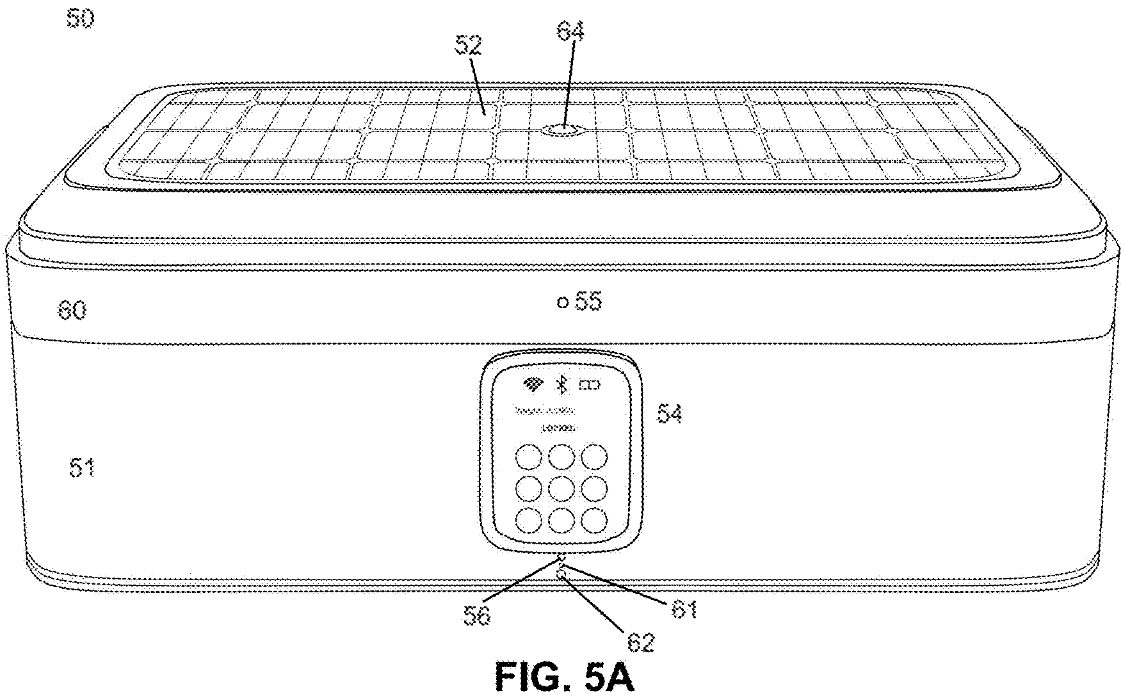
FIG. 5A illustrates an example of the second embodiment of the smart pod in a closed position from a front view.

FIG. 5A shows a front view of the second embodiment of the smart pod 50 in a closed position. The housing 51 of the smart pod 50 is constructed from a tamper-proof material, such as stainless steel or fiberglass-reinforced plastic, ensuring that the contents are secure from unauthorized access. The housing is also weatherproof, waterproof, and fire proof or flame retardant.

The top portion of the smart pod 50 includes a solar panel 52, which provides a sustainable power source for the device by converting sunlight into electrical energy. This solar panel 52 works in conjunction with an onboard battery, such as a lithium-ion battery, to store energy and ensure continuous operation even in low-light conditions. At the centre of the solar panel arrangement is a wide lens camera 64 capable of performing facial recognition and implementing other security features.

The front of the smart pod 50 features an electronic locking mechanism 53, which is controlled via a touch screen display 54. The touch screen display 54, constructed from a durable, shatterproof material, is used for inputting access codes and interacting with the smart pod 50. The interface of the touch screen display 54 is user-friendly, providing clear options for locking, unlocking, and viewing status updates.

Additionally, the front of the smart pod 50 includes an LED status indicator 55 that shows the current locking status (e.g., locked or unlocked) through color-coded signals (e.g., red for locked, green for unlocked). Integrated into the smart pod 50 are various sensors, including a weight sensor that measures the weight of the contents inside, and a motion sensor 56 that detects movement or vibrations, providing alerts if the smart pod 50 is tampered with. The weight sensor can detect changes as small as a few grams, ensuring precise monitoring of the contents. The motion sensor 56 is sensitive to even minor vibrations, triggering alarms and notifications if unauthorized movement is detected. These sensors work in tandem with the control unit, which processes data and communicates with external devices through the wireless communication module.

Figure 5B:
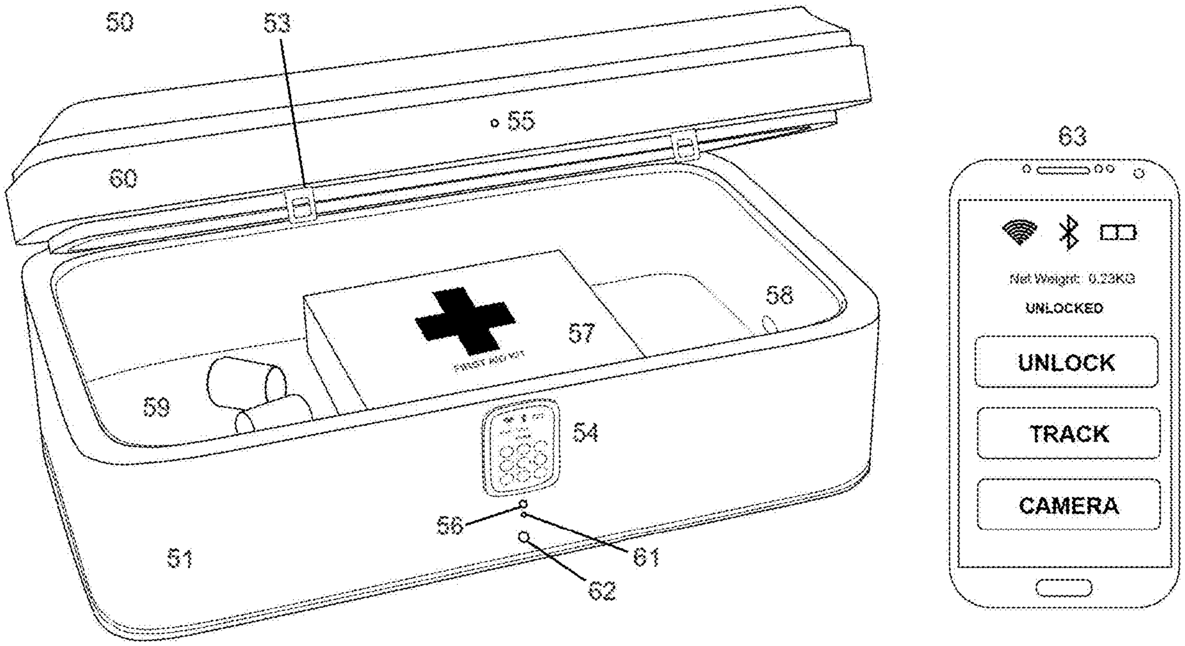
FIG. 5B illustrates an example of the second embodiment of the smart pod in an open position with medication held inside and in wireless communication with a smartphone from a front perspective view.

FIG. 5B shows a front perspective view of the second embodiment of the smart pod 50 in an open position with medication 57 held inside and in wireless communication with a smartphone 63.

The internal compartment 59 is lined with inner foam cushions, which provide protection for the contents against shocks and vibrations during transportation. The foam cushions are made from high-density materials that absorb impact and prevent movement of the contents. The interior of the smart pod 50 includes an internal camera 58, which is strategically placed to capture real-time images or video of the contents. This camera 58 enables users to monitor the contents of the smart pod 50 remotely, providing transparency and security. The internal camera 58 is equipped with high-definition capabilities and can operate under low-light conditions, ensuring continuous monitoring. The camera 58 uses infrared (IR) technology to capture clear images in the dark, and it can stream live video to the user's device via the wireless communication module.

The lid 60 of the smart pod 50 is hinged and can be securely closed using the electronic locking mechanism 53. The hinges are constructed from reinforced materials to prevent forced entry. The housing 51 also includes a speaker 61 and a microphone 62, which facilitate audio communication and alarm functions. The speaker 60 can emit loud alarms to deter theft, while the microphone 61 can pick up sounds around the smart pod 50, providing audio data to the user. Additionally, the smart pod 50 incorporates biometric security mechanisms, such as a fingerprint scanner and a facial recognition system, providing multiple layers of authentication to prevent unauthorized access. The fingerprint scanner uses capacitive sensing technology to capture detailed fingerprints, while the facial recognition system uses advanced algorithms to identify authorized users. An ID scanner is also present, allowing users to scan identification credentials for access verification. This scanner can read various types of IDs, including QR codes, barcodes, and RFID tags.

The medication 57 is securely placed within the internal compartment 56, protected by the inner foam cushions. The internal camera 58 provides a live feed of the contents, which can be accessed remotely via a dedicated software application on the smartphone 63. The wireless communication module 64 enables the smart pod 50 to transmit data, including the live images and status updates, to the smartphone 63. The software application allows users to unlock the smart pod 50, track its location, and monitor the security status in real time.

The smartphone 63 displays various options, such as unlocking the smart pod 50, tracking its location, and accessing the camera feed. Users can also set up notifications for specific events, such as the opening of the smart pod 50, any detected motion, or changes in weight. For example, if the weight sensor detects a significant change, the app will send an alert to the user, indicating a potential issue with the contents. Similarly, if the motion sensor 56 detects movement, the user will receive an immediate notification. The app can also be used to communicate with the smart pod 50 through the speaker 60 and microphone 61, allowing for real-time audio interaction.

The app features a secure login system with options for password protection, fingerprint authentication, or facial recognition, ensuring that only authorized users can access the smart pod's data. The app also provides historical data on the smart pod's usage, allowing users to review past events and monitor the overall security of the delivery process. The LED status indicator 55 provides visual confirmation of the smart pod's status, and the combination of the solar panel 52 and onboard batteries ensures a reliable power source for continuous operation. The smart pod 50 is designed to offer a secure, transparent, and efficient solution for the transportation of high-value or sensitive items, addressing the shortcomings of traditional delivery methods. The integration of multiple sensors and security mechanisms, along with the advanced features of the dedicated app, ensures comprehensive monitoring and control over the delivery process, enhancing the user experience and ensuring the safety of the contents throughout the supply chain.

The software application also enables remote locking and unlocking of the smart pod 50, providing users with the flexibility to control access from any location. Users can schedule specific times for the smart pod 50 to be unlocked or set it to unlock only when it reaches a designated location, using GPS data provided by the wireless communication module. Additionally, the app can generate reports and analytics on the smart pod's activity, helping users to optimize their delivery and storage processes. The smart pod 50 is compatible with various mobile operating systems, ensuring broad accessibility for users.

Controller/Processor Components

A controller or processor as described herein can be any suitable type of computer. A computer may be a uniprocessor or multiprocessor machine. Accordingly, a computer may include one or more processors and, thus, the aforementioned computer system may also include one or more processors. Examples of processors include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), gated logic, programmable control boards (PCBs), and other suitable hardware configured to perform the various functionality described throughout this disclosure.

Additionally, the computer may include one or more memories. Accordingly, the aforementioned computer systems may include one or more memories. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, video tapes, audio tapes, magnetic recording tracks, magnetic tunnel junction (MTJ) memory, optical memory storage, quantum mechanical storage, electronic networks, and/or other devices or technologies used to store electronic content such as programs and data. In particular, the one or more memories may store computer executable instructions that, when executed by the one or more processors, cause the one or more processors to implement the procedures and techniques described herein. The one or more processors may be operably associated with the one or more memories so that the computer executable instructions can be provided to the one or more processors for execution. For example, the one or more processors may be operably associated to the one or more memories through one or more buses. Furthermore, the computer may possess or may be operably associated with input devices (e.g., a keyboard, a keypad, controller, a mouse, a microphone, a touch screen, a sensor) and output devices such as (e.g., a computer screen, printer, or a speaker).

The computer may advantageously be equipped with a network communication device such as a network interface card, a modem, or other network connection device suitable for connecting to one or more networks.

A computer may advantageously contain control logic, or program logic, or other substrate configuration representing data and instructions, which cause the computer to operate in a specific and predefined manner as, described herein. In particular, the computer programs, when executed, enable a control processor to perform and/or cause the performance of features of the present disclosure. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro code, circuitry, data, and/or the like.

The control logic conventionally includes the manipulation of digital bits by the processor and the maintenance of these bits within memory storage devices resident in one or more of the memory storage devices. Such memory storage devices may impose a physical organization upon the collection of stored data bits, which are generally stored by specific electrical or magnetic storage cells.

The control logic generally performs a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, files, or the like. It should be kept in mind, however, that these and some other terms should be associated with appropriate physical quantities for computer operations, and that these terms are merely conventional labels applied to physical quantities that exist within and during operation of the computer based on designed relationships between these physical quantities and the symbolic values they represent.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general-purpose computing machines or devices may be used with programs constructed in accordance with some of the teachings described herein. In some embodiments, very specific computing machines, with specific functionality, may be required.

CONCLUSION

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the smart pod system of the invention have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A smart pod system comprising:

a housing;

a power supply disposed within or on the exterior of the housing;

an electronic locking mechanism disposed on the housing;

at least one sensor disposed on the housing, the at least one sensor selected from the group consisting of a motion sensor, a microphone, and a camera;

an internal camera disposed within the housing, the internal camera configured to capture real-time images or video of the contents within the housing;

a wireless communication module disposed within or on the exterior of the housing, the wireless communication module configured to transmit data, including the real-time images or video captured by the internal camera, to an external device;

a control unit disposed within the housing, the control unit operatively connected to the electronic locking mechanism, the at least one sensor, the internal camera, and the wireless communication module;

a user interface disposed on the housing, the user interface comprising a touch screen and biometric authentication devices;

and a software application executable on the external device, the software application configured to interact with the smart pod system via the wireless communication module to control the electronic locking mechanism, access data from the at least one sensor and the internal camera, receive and display the real-time images or video from the internal camera to enable a user to remotely view the contents within the housing, and manage user authentication via the biometric authentication devices;

wherein the software application provides a user interface for live viewing of the contents during transit, the smart pod system paired with a cloud-based network to transmit live data and live images to the external device via the cloud-based network.

2. The smart pod system of claim 1, wherein the power supply comprises at least one solar panel disposed on the exterior of the housing.

3. The smart pod system of claim 2, wherein the power supply further comprises an onboard battery selected from the group consisting of a lithium-ion battery and a nickel-metal hydride battery.

4. The smart pod system of claim 1, wherein the at least one sensor further comprises a 360-degree external camera disposed on the exterior of the housing.

5. The smart pod system of claim 1, wherein the user interface further comprises an ID reader configured to scan identification credentials.

6. The smart pod system of claim 1, wherein the biometric authentication devices are selected from the group consisting of a fingerprint scanner, a facial recognition scanner, and a retinal scanner.

7. The smart pod system of claim 1, wherein the electronic locking mechanism is configured to be remotely controlled via the software application.

8. The smart pod system of claim 1, wherein the wireless communication module supports connectivity options selected from the group consisting of Wi-Fi and Bluetooth.

9. The smart pod system of claim 1, wherein the housing is constructed from a tamper-proof material selected from the group consisting of stainless steel and fiberglass-reinforced plastic.

10. The smart pod system of claim 1, wherein the control unit further comprises an audible alarm system configured to emit a sound when unauthorized access is detected.

11. The smart pod system of claim 1, wherein the control unit is operatively connected to a global positioning system (GPS) module configured to track the location of the smart pod.

12. The smart pod system of claim 1, further comprising an LED alert light disposed on the exterior of the housing, the LED alert light configured to indicate the status of the electronic locking mechanism.

13. The smart pod system of claim 1, wherein the internal camera is configured to capture high-definition images or video.

14. The smart pod system of claim 1, wherein the control unit includes a microcontroller and onboard firmware memory.

15. The smart pod system of claim 1, wherein the software application is configured to provide real-time notifications to users regarding the status and security of the smart pod.

16. The smart pod system of claim 1, further comprising an anti-theft tracking chip disposed within the housing, the anti-theft tracking chip configured to provide real-time location updates.

17. The smart pod system of claim 1, wherein the housing further comprises internal foam cushions configured to protect the contents of the smart pod during transit.

18. The smart pod system of claim 1, wherein the software application is configured to interact with the smart pod system via a cloud-based network.

19. The smart pod system of claim 1, further comprising a manual override switch disposed on the exterior of the housing, the manual override switch configured to allow manual access to the contents of the smart pod.

20. The smart pod system of claim 1, wherein the software application is further configured to store and analyze historical data related to the smart pod's usage and security events.

* * * * *